United States Patent
Tagesson

(10) Patent No.: US 10,940,733 B2
(45) Date of Patent: Mar. 9, 2021

(54) AIR SUSPENSION EVACUATION FOR IMPROVED BRAKING PERFORMANCE

(71) Applicant: Volvo Truck Corporation, Gothenburg (SE)

(72) Inventor: Kristoffer Tagesson, Gothenburg (SE)

(73) Assignee: VOLVO TRUCK CORPORATION, Göteborg (SE)

(*) Notice: Subject to any disclaimer, the term of this patent is extended or adjusted under 35 U.S.C. 154(b) by 202 days.

(21) Appl. No.: 16/326,596

(22) PCT Filed: Aug. 29, 2016

(86) PCT No.: PCT/EP2016/070314
§ 371 (c)(1),
(2) Date: Feb. 19, 2019

(87) PCT Pub. No.: WO2018/041328
PCT Pub. Date: Mar. 8, 2018

(65) Prior Publication Data
US 2020/0086709 A1    Mar. 19, 2020

(51) Int. Cl.
*B60G 17/0195* (2006.01)
*B60G 5/00* (2006.01)
(Continued)

(52) U.S. Cl.
CPC .......... *B60G 17/0195* (2013.01); *B60G 5/00* (2013.01); *B60G 17/04* (2013.01);
(Continued)

(58) Field of Classification Search
CPC .. B60G 17/0195; B60G 5/00; B60G 17/0525; B60G 2400/204; B60G 2400/39;
(Continued)

(56) References Cited

U.S. PATENT DOCUMENTS 3,920,283 A    11/1975  Strader
3,942,845 A *   3/1976  Levering ................. B60T 8/349
                                                        303/112

(Continued)

FOREIGN PATENT DOCUMENTS

CN    103832418 A    6/2014
DE      4141695 A1   7/1993
(Continued)

OTHER PUBLICATIONS

International Search Report and Written Opinion for International Patent Application No. PCT/EP2016/070314, dated May 3, 2017, 10 pages.

(Continued)

*Primary Examiner* — Russell Frejd
(74) *Attorney, Agent, or Firm* — Withrow & Terranova PLLC

(57) ABSTRACT

The invention i.a. relates to a load transfer arrangement (10) for a vehicle (12) including a chassis (14) with at least one braked axle (16), the arrangement (10) comprising: a non-driven load axle (18), and an air suspension assembly (20) including at least one air cushion (22) arranged between the chassis (14) and the non-driven load axle (18) in order to transfer load from the braked axle(s) (16) to the non-driven load axle (18), wherein the non-driven load axle (18) is unbraked, and wherein the arrangement (10) further comprises: an evacuation controller (24) configured to provide a pressure release trigger in response to a current or predicted braking event of the vehicle (12), and at least one evacuation valve (26) configured to, in response to receiving the pressure release trigger, evacuate pressure from the at least one air cushion (22) in order to remove load from the non-driven load axle (18) and increase load on the braked axle(s) (16).

20 Claims, 3 Drawing Sheets

(51) Int. Cl.
  *B60G 17/052*  (2006.01)
  *B60T 7/04*  (2006.01)
  *B60T 7/22*  (2006.01)
  *B60T 8/171*  (2006.01)
  *B60T 8/18*  (2006.01)
  *B60T 8/32*  (2006.01)
  *B60W 10/184*  (2012.01)
  *B60W 10/22*  (2006.01)
  *B60W 30/095*  (2012.01)
  *B60W 30/18*  (2012.01)
  *B60G 17/04*  (2006.01)
  *B60T 8/34*  (2006.01)
  *B60T 8/172*  (2006.01)

(52) U.S. Cl.
  CPC .......... *B60G 17/0525* (2013.01); *B60T 7/042* (2013.01); *B60T 7/22* (2013.01); *B60T 8/171* (2013.01); *B60T 8/172* (2013.01); *B60T 8/18* (2013.01); *B60T 8/3255* (2013.01); *B60T 8/3285* (2013.01); *B60T 8/349* (2013.01); *B60W 10/184* (2013.01); *B60W 10/22* (2013.01); *B60W 30/0953* (2013.01); *B60W 30/0956* (2013.01); *B60W 30/18109* (2013.01); B60G 2400/204 (2013.01); B60G 2400/39 (2013.01); B60G 2400/61 (2013.01); B60G 2500/302 (2013.01); B60G 2800/214 (2013.01); B60G 2800/22 (2013.01); B60T 2210/12 (2013.01); B60T 2210/36 (2013.01); B60T 2220/04 (2013.01); B60T 2250/00 (2013.01); B60T 2260/06 (2013.01); B60W 2510/22 (2013.01); B60W 2520/10 (2013.01); B60W 2530/10 (2013.01); B60W 2540/10 (2013.01); B60W 2540/12 (2013.01); B60W 2552/40 (2020.02); B60W 2710/182 (2013.01); B60W 2710/22 (2013.01)

(58) Field of Classification Search
  CPC .......... B60G 2400/61; B60G 2500/302; B60G 2800/22; B60G 2800/214; B60G 17/04; B60T 7/042; B60T 7/22; B60T 8/171; B60T 8/172; B60T 8/18; B60T 8/3255; B60T 8/3285; B60T 2210/12; B60T 2210/36; B60T 2220/04; B60T 2250/00; B60T 2260/06; B60T 8/349; B60W 10/184; B60W 10/22; B60W 30/0953; B60W 30/0956; B60W 30/18109; B60W 2510/22; B60W 2510/252; B60W 2510/10; B60W 2530/10; B60W 2540/10; B60W 2540/12; B60W 2710/182; B60W 2710/22

See application file for complete search history.

(56) References Cited

U.S. PATENT DOCUMENTS

| | | | |
|---|---|---|---|
| 4,141,430 A | | 2/1979 | Eddy, Jr. |
| 7,032,913 B2* | | 4/2006 | Bryant .................... B60G 3/20 |
| | | | 280/124.141 |
| 7,249,776 B2* | | 7/2007 | Bryant .................... B60G 3/20 |
| | | | 267/70 |
| 2014/0297118 A1 | | 10/2014 | Eberling |
| 2015/0329099 A1* | | 11/2015 | Zawacki ............. B60G 17/052 |
| | | | 701/37 |

FOREIGN PATENT DOCUMENTS

| | | |
|---|---|---|
| DE | 10354289 A1 | 6/2005 |
| EP | 1698535 A2 | 9/2006 |
| WO | 0000360 A1 | 1/2000 |
| WO | 2015134231 A1 | 9/2015 |

OTHER PUBLICATIONS

First Office Action for Chinese Patent Application No. 201680088634.4, dated Dec. 24, 2020, 12 pages.

\* cited by examiner

AIR SUSPENSION EVACUATION FOR IMPROVED BRAKING PERFORMANCE

This application is a 35 USC 371 National Phase filing of International Application No. PCT/EP2016/070314, filed Aug. 29, 2016, the disclosure of which is incorporated herein by reference in its entirety.

TECHNICAL FIELD

The invention relates to vehicles having an air suspended non-driven load axle, sometimes referred to as a tag axle or pusher axle. More specifically, the invention relates to increase braking performance in such a vehicle.

The invention can be applied in heavy-duty vehicles, such as trucks, buses and construction equipment.

BACKGROUND

It is well known to use one or several non-driven load axles to relieve the driven wheel axles from a portion of the load weight. A non-driven axle arranged in front of a driven axle is referred to as a pusher axle, while a non-driven axle arranged behind a driven axle is referred to as a tag axle.

Non-driven axles are typically air suspended e.g. by means of air bellows, and the air pressure can be controllable. In this manner, it is possible to increase or decrease the load absorbed by the non-driven axle, and when the vehicle is carrying only a small load, or no load at all, the non-driven axle may be completely disabled.

When a non-driven axle is active, and absorbs part of the load, this affects the traction of the driven axle(s), which in some situations may cause problems. Various solutions have been suggested for handling such problems, and as an example, document U.S. Pat. No. 4,141,430 discloses a tag-axle control system which deactivates a tag axle in case of an overspin condition.

In order for ensure satisfactory braking performance, conventional non-driven axles are provided with brakes. Thereby, the entire load, also the portion of the load that is absorbed by the non-driven axle, is used to provide braking traction. Document WO 00/00360 discloses a traction control system in a vehicle having a combination of driven and non-driven axles, where each axle is provided with brakes. With such a control system, load can be transferred between driven and non-driven axles to improve traction performance.

However, a drawback with providing non-driven axles with brakes is that the brake arrangement adds weight and cost to the chassis.

SUMMARY

Based on this, it is an object of the present invention to provide satisfactory braking performance in a vehicle having a non-driven load axle without brakes (also referred to as an "unbraked" load axle).

According to a first aspect, this object is achieved by a load transfer arrangement for a vehicle including a chassis with at least one braked axle, the arrangement comprising: a non-driven load axle, and an air suspension assembly including at least one air cushion arranged between the chassis and the non-driven load axle in order to transfer load from the braked axle(s) to the non-driven load axle, wherein the non-driven load axle is unbraked, and wherein the arrangement further comprises: an evacuation controller configured to provide a pressure release trigger in response to a current or predicted braking event of the vehicle, and at least one evacuation valve configured to, in response to receiving the pressure release trigger, evacuate pressure from the at least one air cushion in order to remove load from the non-driven load axle and increase load on the braked axle(s).

By means of the present invention, full or almost full braking power can be ensured also when using a non-driven axle without brakes. In a situation where a braking event is detected or predicted, the evacuation valve(s) will evacuate pressure from the air cushion(s), thereby transferring all, or at least sufficient, load from the non-driven axle to the braked axle(s) where braking force will be applied.

By eliminating the need for mounting brakes on the non-driven axle, the non-driven axle can be made lighter and less expensive.

In some embodiments of the invention, the evacuation controller is configured to identify a braking demand and to provide the pressure release trigger based on the braking demand. For example, the pressure release trigger can be provided when the braking demand exceeds a braking demand threshold. The braking demand threshold may be a function of at least one of current load of the braked axle(s), current load of the non-driven load axle, current load of one or more other axles (such as the front axle), current road friction and current vehicle speed.

The breaking demand can be an actual (current) braking demand received from a vehicle brake controller. This is a straightforward way to implement the invention.

Alternatively, the arrangement may comprise a brake pedal sensor arranged to detect a position of a brake pedal of the vehicle, and in this case the (actual) braking demand may be identified as a function of the detected position of the brake pedal. For example the braking demand may be considered to be proportional to the instantaneous position of the brake pedal, or to depend on the speed the brake pedal is depressed, or even the acceleration of the brake pedal. Movement of a braking pedal provides a simple and direct information about a braking action that is about to take place or that has already been initiated. In the latter case, a current braking demand is used as an indicator of a continued (future) braking demand.

The arrangement may also comprise an accelerator pedal sensor arranged to detect a position of an accelerator pedal of the vehicle, and in this case an estimated braking demand can be based on a function of the detected position of the accelerator pedal. For example, a sudden release of the accelerator pedal indicates a likely braking demand.

In other embodiments, the evacuation controller is configured to identify a likelihood of a braking event and to provide the pressure release trigger when said likelihood is greater than a predefined value.

It should be noted that the evacuation of the air cushion here is based on probability, in the sense that it may be advantageous to transfer load to the braked axle(s) as soon as there is an increase likelihood of a braking event. The load transfer thus serves as a way to prepare the vehicle for a sudden braking action when it is considered likely that such a braking action may be required. If there is no braking action, pressure can be restored in the suspension assembly. Such a process of temporarily deflating the air suspension of the non-driven axle may be performed without the express knowledge of the driver.

As one option, the evacuation controller can be connected to an on-board navigation system in order to receive map information relative a current vehicle position, and wherein the likelihood of a braking event is determined based on received map information. For example, when operating the vehicle in residential areas or outside schools, it may be desirable to be prepared for sudden braking action.

As yet another option, the evacuation controller is connected to a sensor arranged to detect a distance to another vehicle or other obstacle, and wherein the likelihood of a braking event is determined based on a function of said distance. For example, if the distance to a forward vehicle decreases rapidly, or decreases below a given threshold, a braking action may be expected.

According to a second aspect of the invention, this object is achieved by a vehicle comprising a chassis having at least one braked axle, and a load transfer arrangement according to the first aspect.

The advantages of the present invention are expected to be especially significant when the non-driven axle without braking capacity is a pusher axle, i.e. arranged in front of a driven axle. In this case, the braking action tends to further increase load on the pusher axle, thus potentially loosing even further braking power on the driven axle. However, the invention may certainly also be beneficial when the non-driven axle without braking capacity is a tag axle, i.e. arranged behind a driven axle.

Other aspects of the present invention include a method for transferring load between a braked axle and a non-driven, unbraked axle of a chassis of a vehicle, a computer program product configured to performing the method when executed on a computer processor, and a non-transitory computer readable medium.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
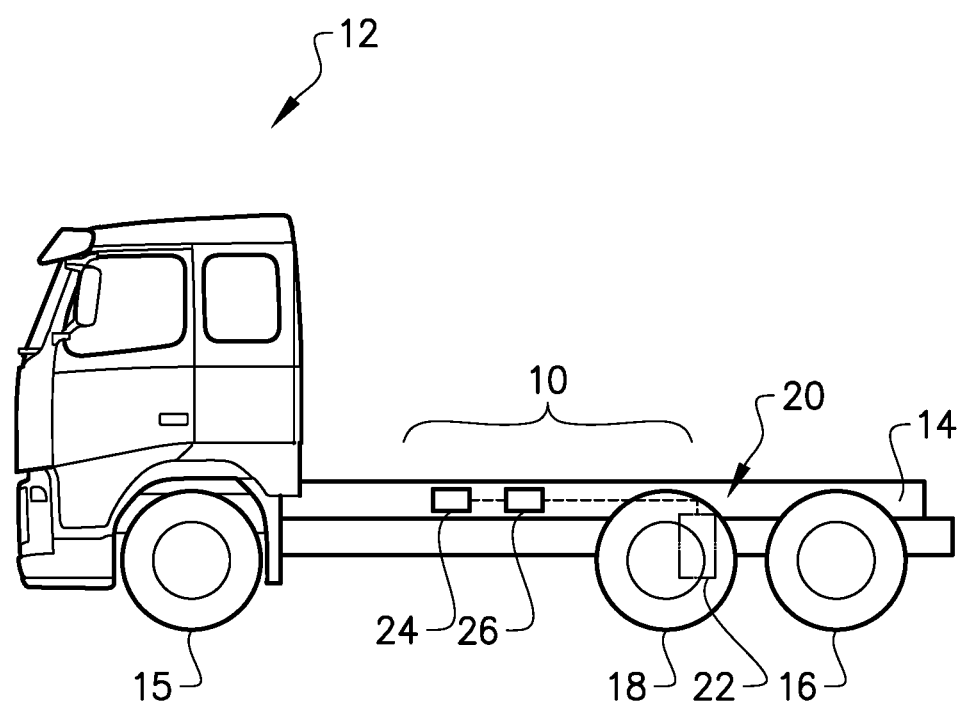
FIG. 1 is a schematic side view of a vehicle comprising a load transfer arrangement according to embodiments of the present invention.

FIG. 1 illustrates a vehicle 12. The illustrated vehicle 12 is a truck, such as a heavy duty truck. The vehicle 12 comprises a chassis 14. The chassis 12 has a front axle 15, a braked rear axle 16, and a non-driven load (rear) axle 18. The non-driven load axle 18 is unbraked, i.e. it does not have any brakes. The non-driven load axle 18 is arranged in front of the braked axle 16, and may be referred to as a pusher axle. The vehicle 12 also comprises an air suspension assembly 20 including at least one air cushion 22. The at least one air cushion 22 is arranged between the chassis 14 and the non-driven load axle 18, i.e. it is arranged to transfer forces from the chassis to the axle so as to transfer load from the braked axle 16 to the non-driven load axle 18. The air cushion(s) 22 could be physically located under or outside the frame of the chassis 14. By adjusting the pressure in the air cushion(s), the air suspension assembly 20 may increase or decrease the load that is transferred to the non-driven load axle 18, in order to distribute load between the braked axle 16 and the non-driven load axle 18.

The non-driven load axle 18 and the air suspension assembly 20 form part of a load transfer arrangement 10, which load transfer arrangement 10 further comprises an evacuation controller 24 and at least one evacuation valve 26. The evacuation controller 24 is configured to provide a pressure release trigger in response to a current or predicted braking event of the vehicle 12. The evacuation controller 24 may be embodied by appropriate hardware and/or software. The at least one evacuation valve 26 is configured to, in response to receiving the pressure release trigger from the evacuation controller 24, evacuate pressure from the air cushion(s) 22, in order to remove load from the non-driven load axle 18, and consequently increase load on the braked axle 16 where braking force will be applied. In this way, full or almost full braking power can be ensured also when using a non-driven axle load 18 without brakes.

Figure 2:
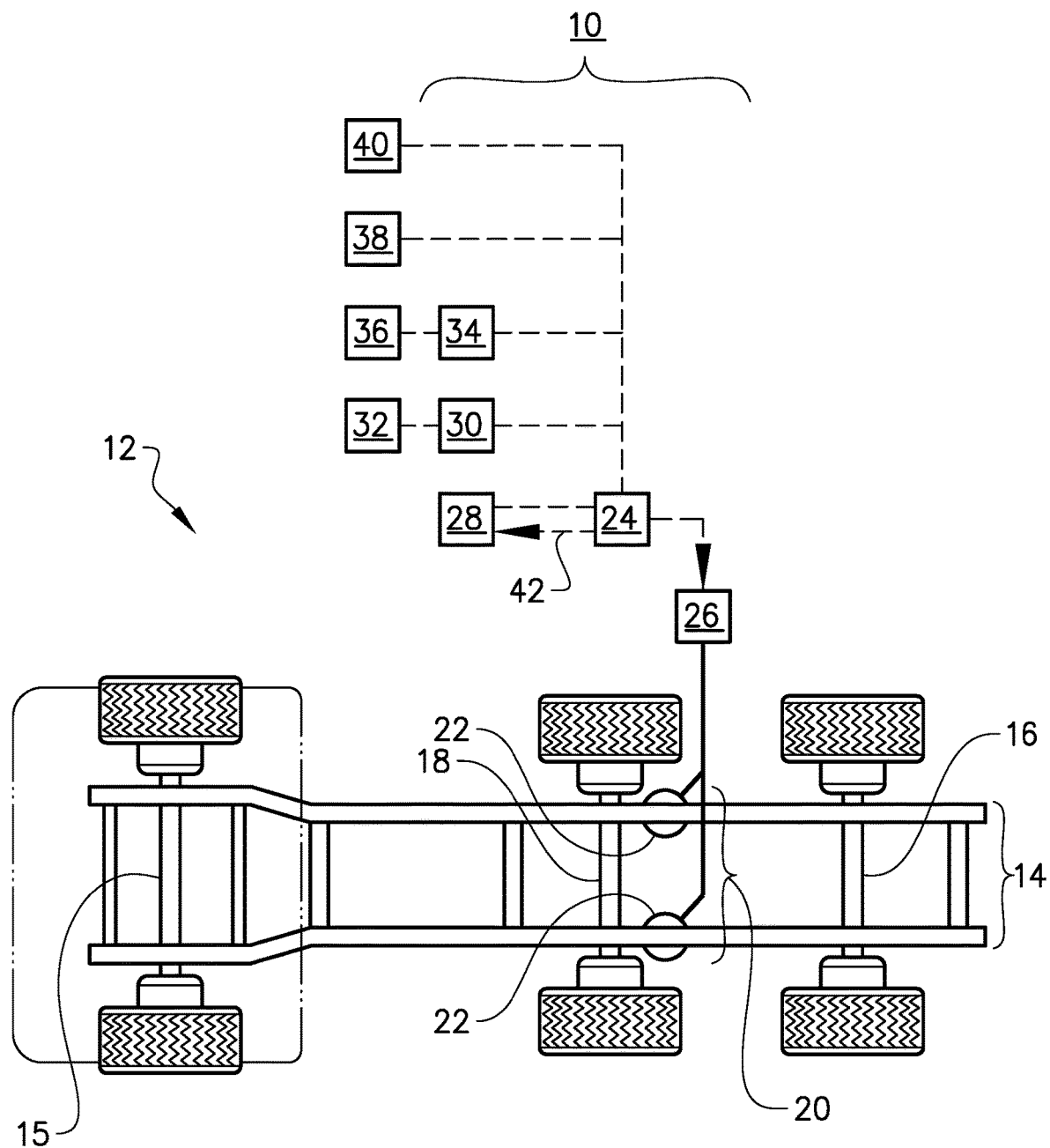
FIG. 2 is a schematic top view of a load transfer arrangement for a vehicle according to embodiments of the present invention.

FIG. 2 illustrates in more detail various embodiments of the load transfer arrangement 10. In FIG. 2 there is a common evacuation valve 26 for both air cushions 22, but there could alternative be one evacuation valve per air cushion, for example.

In some embodiments, the evacuation controller 24 is configured to identify a braking demand, and to provide the aforementioned pressure release trigger based on the braking demand. The pressure release trigger can for example be provided when the braking demand exceeds a braking demand threshold. The braking demand, and the corresponding threshold, may for example be expressed as vehicle deceleration (xx m/s$^2$) or vehicle total brake force (yy kN). Furthermore, the braking demand threshold may be a function of at least one of current load of the braked axle 16, current load of the non-driven load axle 18, current load of the front axle 15, current road friction and current vehicle speed. The braking demand threshold can for example be proportional to the coefficient of friction between wheels and road times the proportion of total vehicle load being carried by axles other than the non-driven load axle 18. A relation with respect to vehicle speed can also be introduced by applying different proportional gains for different vehicle speeds.

In one embodiment, the aforementioned breaking demand is an actual (current) braking demand received from a vehicle brake controller 28 of the vehicle 12. The vehicle brake controller 28 could also be included in the load transfer arrangement 10.

Alternatively, or complementary, the load transfer arrangement 10 may comprise a brake pedal sensor 30 arranged to detect a position of a brake pedal 32 of the vehicle 12. The breaking demand may then be identified by the evacuation controller 24 as a function of the detected position of the brake pedal 32.

The load transfer arrangement 10 may also comprise an accelerator pedal sensor 34 arranged to detect a position of an accelerator pedal 36 of the vehicle 12. In this case the braking demand is an estimated braking demand based on a function of the detected position of the accelerator pedal 36. The accelerator pedal 36 could also be referred to as a throttle (pedal).

In other embodiments also illustrated in FIG. 2, the evacuation controller 24 is configured to identify a likelihood of a braking event, and to provide the pressure release trigger to the evacuation valve 26 when the likelihood is greater than a predefined value. The likelihood and the predefined value may for example be express as percentages.

The evacuation controller 24 may for example be connected to a navigation system 38 on board the vehicle 12, in order to receive map information relative a current vehicle position. The likelihood of a braking event may then be determined by the evacuation controller 24 based on received map information. If the received map information indicates that the vehicle 12 is passing a school, the likelihood for a braking event may for example be determined to be higher than if the received map information indicates that the vehicle 12 is travelling along a remote highway. The navigation system 38 may for example be a GPS system.

As yet another option, the evacuation controller 24 may be connected to a sensor 40 arranged to detect a distance to another vehicle or other obstacle (not shown) ahead of the vehicle 12, wherein the likelihood of a braking event is determined based on a function of the distance. The distance could for example be expressed in meters (or some equivalent unit) or as time. The sensor 40 can for example include at least one of a radar, a lidar, and an ultrasonic detector.

Figure 3:
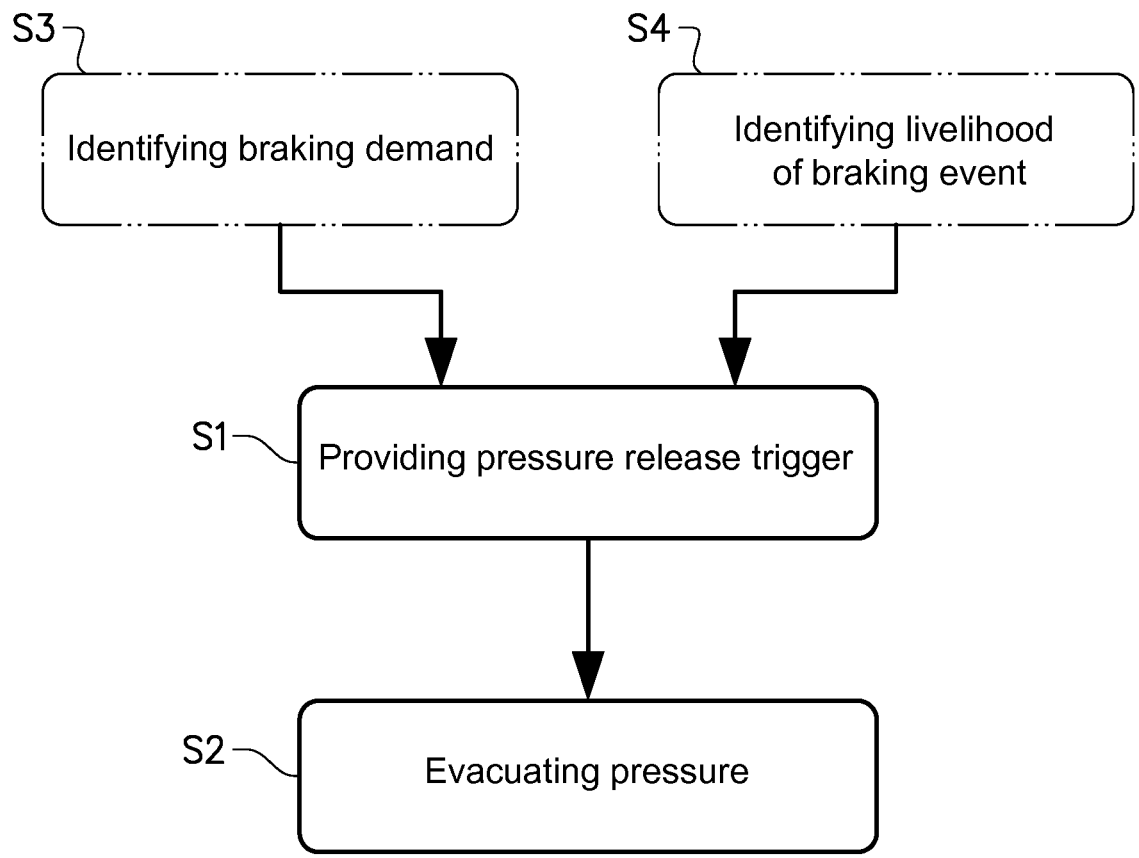
FIG. 3 is a flow chart of a method according to embodiments of the present invention.

With further reference to FIG. 3, a load transferring method according to embodiments of the present invention will now be described. The method may at least partly be carried out by the load transfer arrangement 10. The method may transfer load between the braked axle 16 and the non-driven, unbraked axle 18 of the chassis 14 of the vehicle 12, wherein the non-driven, unbraked load axle 18 is suspended by the air suspension assembly 20 including the at least one air cushion 22 arranged between the chassis 14 and the non-driven, unbraked load axle 18. The method comprises a first step S1 of providing a pressure release trigger in response to a current or predicted braking event; and, in response to the pressure release trigger, a second step S2 of evacuating pressure from the at least one air cushion 22 in order to remove load from the non-driven, unbraked load axle 18 and increase load on the braked axle(s) 16.

The method may further comprise the additional step S3 identifying a braking demand, and providing the pressure release trigger based on the braking demand. The braking demand may be identified as described above.

In other embodiments, the method may further comprise the additional step S4 identifying a likelihood of a braking event, and providing the pressure release trigger when the likelihood is greater than a predefined value. The likelihood may be determined as described above.

It is to be understood that the present invention is not limited to the embodiments described above and illustrated in the drawings; rather, the skilled person will recognize that many changes and modifications may be made within the scope of the appended claims.

For example, the evacuation controller 24 may be configured to provide valve state information, i.e. the current state of the evacuation valve(s) 26, to the vehicle brake controller 28, as illustrated by arrow 42 in FIG. 2. The valve state information may be used in the vehicle brake controller 28 to better allocate brake action to other axles. For example, limited brake action can be ensured until information of open evacuation valve has appeared, where immediately more aggressive brake action can be commanded without risking e.g. wheel locking.

The invention claimed is:

1. A load transfer arrangement for a vehicle including a chassis with at least one braked axle, the arrangement comprising:
   a non-driven load axle, and
   an air suspension assembly including at least one air cushion arranged between the chassis and the non-driven load axle in order to transfer load from the braked axle(s) to the non-driven load axle,
   characterized in that
   the non-driven load axle is unbraked, and wherein the arrangement further comprises:
   an evacuation controller configured to provide a pressure release trigger in response to a current or predicted braking event of the vehicle, and
   at least one evacuation valve configured to, in response to receiving the pressure release trigger, evacuate pressure from the at least one air cushion in order to remove load from the non-driven load axle and increase load on the braked axle(s).

2. The load transfer arrangement according to claim 1, wherein the evacuation controller is configured to identify a braking demand and to provide the pressure release trigger based on the braking demand.

3. The load transfer arrangement according to claim 2, wherein the evacuation controller is configured to provide the pressure release trigger when the braking demand exceeds a braking demand threshold.

4. The load transfer arrangement according to claim 3, wherein the braking demand threshold is a function of at least one of current load of the braked axle(s), current load of the non-driven load axle, current load of one or more other axles, current road friction and current vehicle speed.

5. The load transfer arrangement according to claim 2, wherein the braking demand is an actual braking demand received from a vehicle brake controller.

6. The load transfer arrangement according to claim 2, further comprising a brake pedal sensor arranged to detect a position of a brake pedal of the vehicle, and wherein the braking demand is identified as a function of the detected position of the brake pedal.

7. The load transfer arrangement according to on claim 2, further comprising an accelerator pedal sensor arranged to detect a position of an accelerator pedal of the vehicle, and wherein the braking demand is an estimated braking demand based on a function of the detected position of the accelerator pedal.

8. The load transfer arrangement according to claim 1, wherein the evacuation controller is configured to identify a likelihood of a braking event and to provide the pressure release trigger when said likelihood is greater than a predefined value.

9. The load transfer arrangement according to claim 8, wherein the evacuation controller is connected to an on-board navigation system in order to receive map information relative to a current vehicle position, and wherein the likelihood of a braking event is determined based on received map information.

10. The load transfer arrangement according to claim 8, wherein the evacuation controller is connected to a distance sensor arranged to detect a distance to another vehicle or other obstacle, and wherein the likelihood of a braking event is determined based on a function of said distance.

11. The load transfer arrangement according to claim 1, wherein the non-driven, unbraked axle is a pusher axle.

12. A method for transferring load between at least one braked axle and a non-driven, unbraked axle of a chassis of a vehicle, wherein the non-driven, unbraked load axle is suspended by an air suspension assembly including at least one air cushion arranged between the chassis and the non-driven, unbraked load axle in order to transfer load from the braked axle(s) to the non-driven unbraked load axle, characterized by the steps of:

providing a pressure release trigger in response to a current or predicted braking event, and in response to the pressure release trigger, evacuating pressure from the at least one air cushion in order to remove load from the non-driven, unbraked load axle and increase load on the braked axle(s).

13. The method according to claim 12, further comprising identifying a braking demand and providing the pressure release trigger based on the braking demand.

14. The method according to claim 13, wherein the pressure release trigger is provided when the braking demand exceeds a braking demand threshold.

15. The method according to claim 14, wherein the braking demand threshold is a function of at least one of current load of the braked axle(s), current load of the non-driven load axle, current load of one or more other axles, current road friction and current vehicle speed.

16. The method according to claim 13, further comprising receiving an actual braking demand from a vehicle brake controller.

17. The method according to claim 13, further comprising detecting a position of a brake pedal of the vehicle, and identifying the braking demand as a function of the detected position of the brake pedal.

18. The method according to claim 12, further comprising identifying a likelihood of a braking event and providing the pressure release trigger when said likelihood is greater than a predefined value.

19. The method according to claim 18, wherein the likelihood of a braking event is determined based on map information relative to a current vehicle position.

20. The method according to claim 18, wherein the likelihood of a braking event is determined based on a function of a distance to another vehicle or other obstacle.

* * * * *